Figure 4:
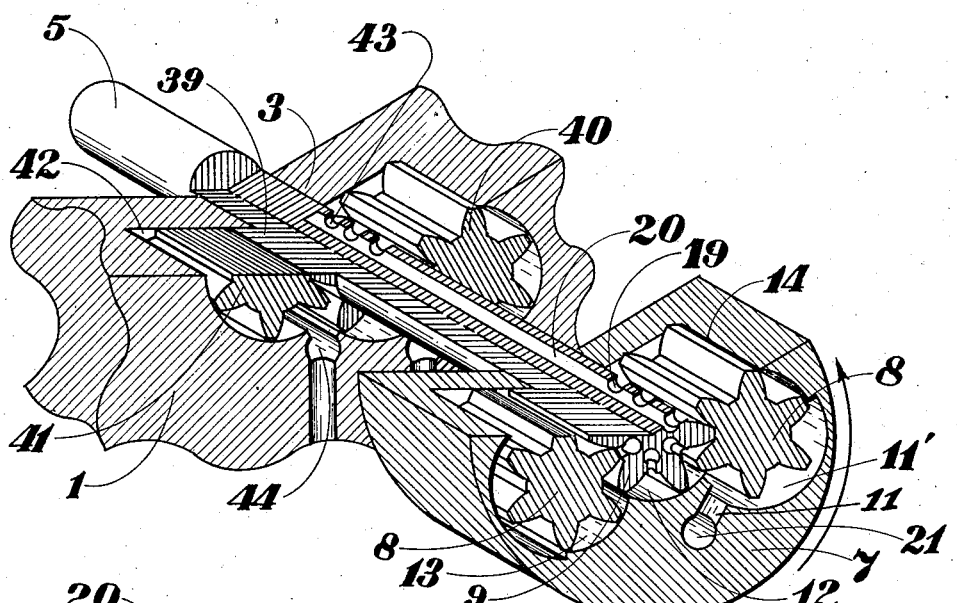

April 2, 1946.  D. P. FULLERTON, JR  2,397,480
VARIABLE SPEED TRANSMISSION
Filed June 20, 1939    4 Sheets-Sheet 1
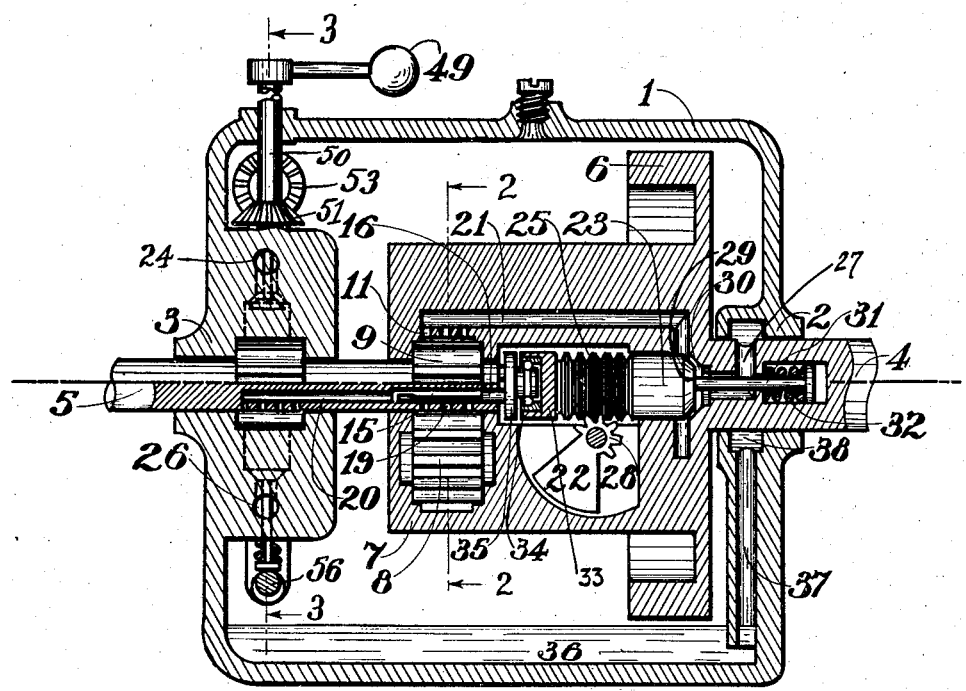
Fig. 1
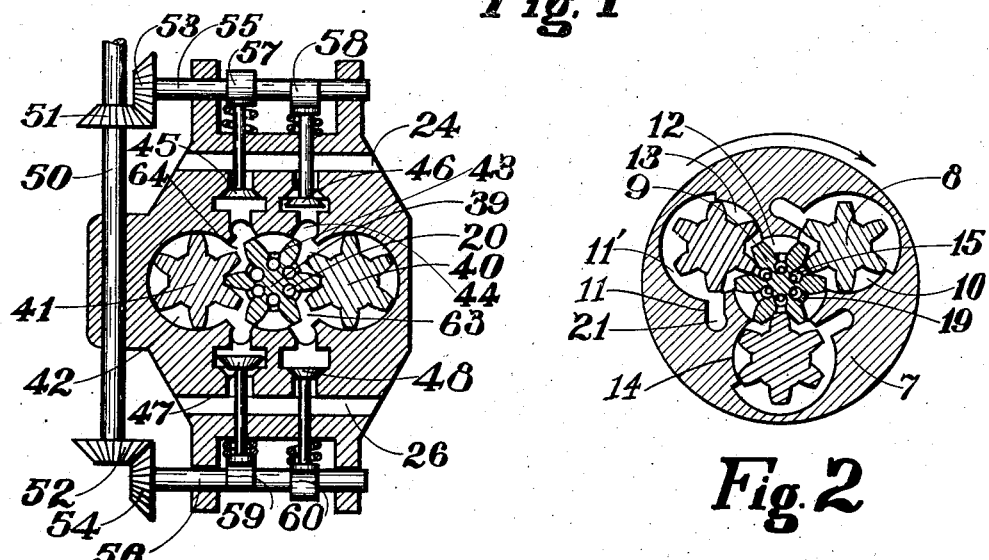
Fig. 3
Fig. 2
Dick P. Fullerton, Jr.
INVENTOR
BY
ATTORNEY April 2, 1946.    D. P. FULLERTON, JR    2,397,480
VARIABLE SPEED TRANSMISSION
Filed June 20, 1939    4 Sheets-Sheet 2

Dick P. Fullerton, Jr.
INVENTOR
BY
ATTORNEY

April 2, 1946.　　D. P. FULLERTON, JR　　2,397,480
VARIABLE SPEED TRANSMISSION
Filed June 20, 1939　　4 Sheets-Sheet 3

Dick P. Fullerton, Jr.
INVENTOR

BY

ATTORNEY

April 2, 1946.　　　D. P. FULLERTON, JR　　　2,397,480
VARIABLE SPEED TRANSMISSION
Filed June 20, 1939　　　4 Sheets-Sheet 4
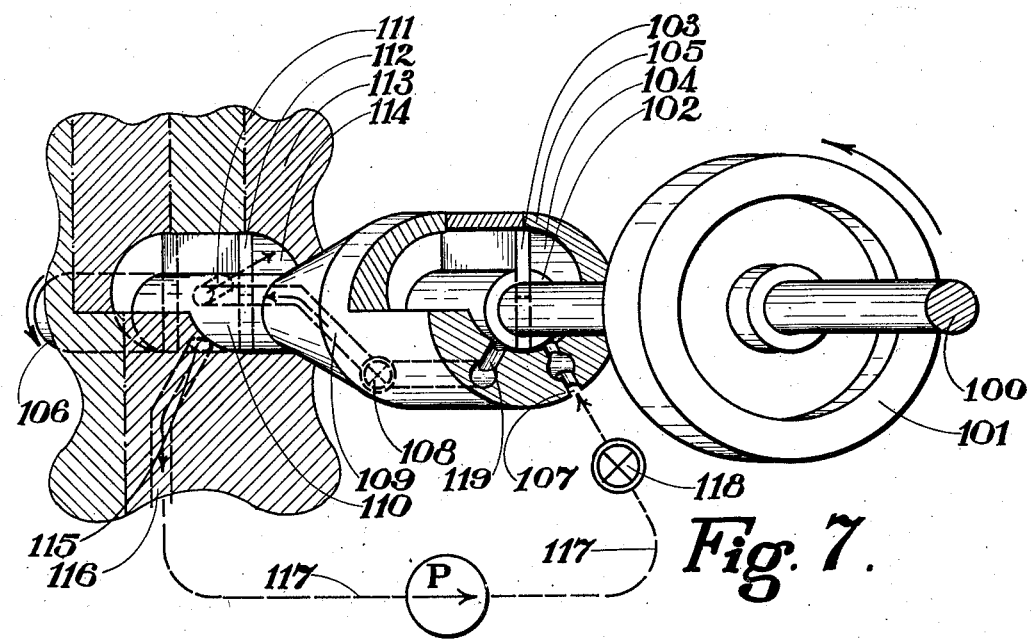
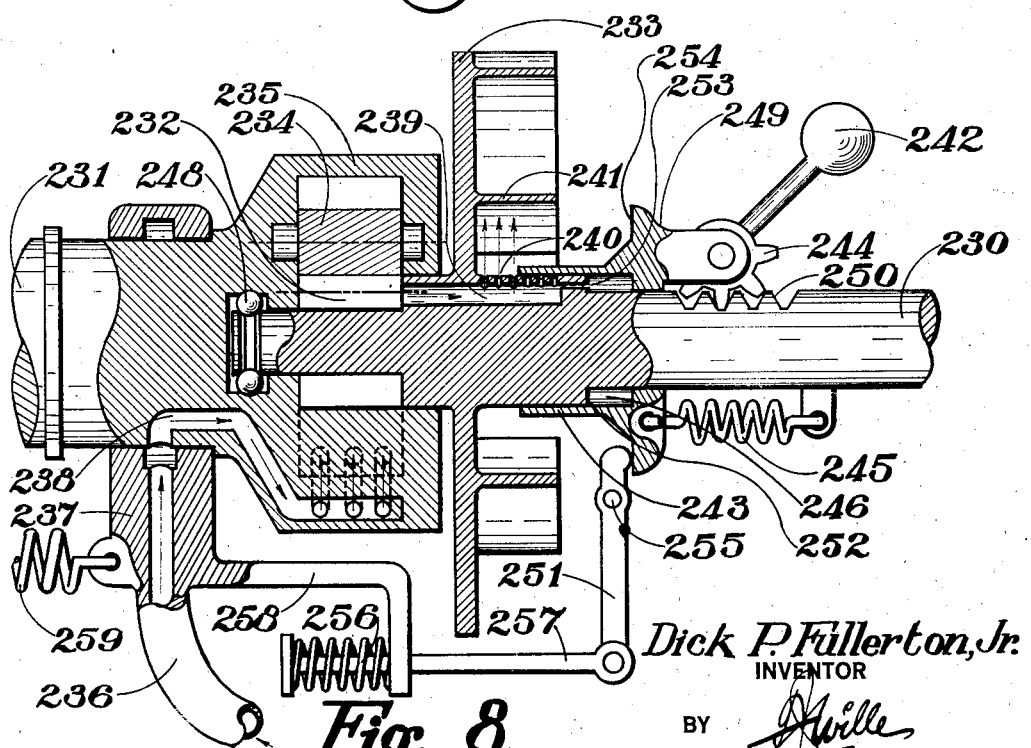
Dick P. Fullerton, Jr.
INVENTOR
BY
ATTORNEY Patented Apr. 2, 1946

2,397,480

UNITED STATES PATENT OFFICE 2,397,480

VARIABLE-SPEED TRANSMISSION

Dicks Phelps Fullerton, Jr., New York, N. Y.

Application June 20, 1939, Serial No. 280,075

19 Claims. (Cl. 60—53)

An object of this invention is to provide a variable speed transmission employing a fluid flow variably controlled by the particular requirements to be met.

A further object is to provide a hydraulic torque converting mechanism having means enabling a full automatic control of the ratio of driving to driven torque.

A further object is to provide improved means for controlling a variable speed transmission employing planetary gears.

A further object is to provide improved means for controlling the flow of fluid in a planetary gear type hydraulic tranmission.

A further object is to provide an improved hydro-mechanical torque converter in which the ordinary hydraulic actions adequate to meet ordinary operating conditions are supplemented by pulse action to meet extraordinary conditions.

A further object is to provide a hydro-mechanical torque converter in which the energy of the differential fluid is used to produce additional torque.

A further object is to provide a hydro-mechanical transmission in which the fluid flow tends to stabilize a direct drive between a driving and a driven shaft for all speeds of the driving shaft.

A further object is to provide a hydraulic torque converter in which gearing, comprising a part of the transmission, also propels or is propelled by the fluid, the amount of fluid propelled or propelling being automatically variable in accordance with the obtaining conditions of power and load.

Still another object is to provide a hydraulic mechanism for transmission of power in automotive vehicles adapted for interposition between a driving and a driven member in which the flow of hydraulic medium is controlled so as to regulate the transmission between, as also the direction of relative rotation of, the driving and driven member.

With the hereinbefore mentioned objects, as also other objects appearing from the specification, the invention comprises the combination of elements and the details of construction hereinafter, respectively, claimed and described, it being understood that the invention is not confined to the structures embodying the invention herein described but solely as required by the scope of the claims.

Figure 5:
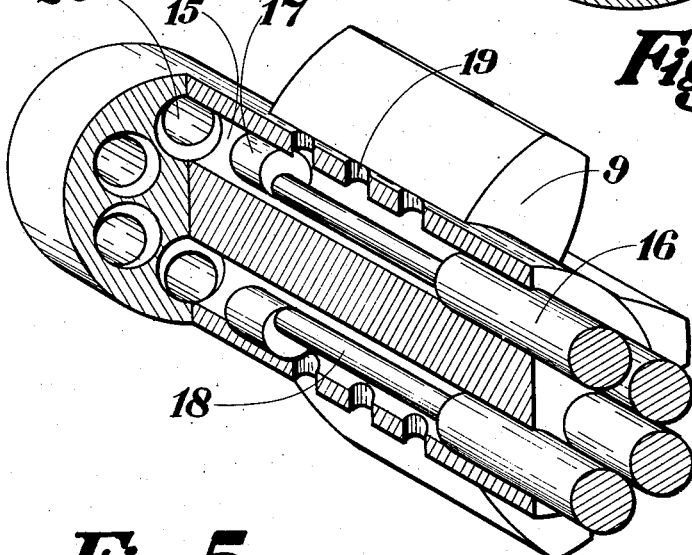

In the accompanying drawings:

Figure 1 discloses a longitudinal section through one form of my hydraulic torque converter;

Figure 2 a cross section on line 2—2 of Figure 1 showing the gear pumping mechanism of that embodiment;

Figure 3 a cross section on line 3—3 of Figure 1 showing the hydraulic motor mechanism of that embodiment;

Figure 4 a simplified perspective, partially in section and exposed, of the pump and motor mechanisms of that embodiment;

Figure 5 a perspective, partially in section and exposed, of the pump sun gear with its throttling plungers employed in the structure of Figure 1;

Figures 6A, 6B, 6C, and 7, schematic drawings for the purpose of assisting in the understanding of my invention; and Figure 8 still another alternative form of my hydraulic transmission employing a turbine, in longitudinal section.

Figures 1 to 5 inclusive disclose my invention incorporated in a power transmission primarily designed for automotive purposes and particularly suited for high torque requirements, such as, for example, in truck and tractor applications. Housing 1 is provided with shaft bearings 2 and 3 supporting, respectively, the driving shaft 4 and the driven shaft 5. Driving shaft 4 is integral with the flywheel 6 and the pump planet housing 7. Housing 1 completely encloses the pump planet and motor planet mechanism which couples the driving and driven shafts, and is conveniently affixed to the chassis of the motor vehicle. Driving shaft 4 is propelled by a prime mover (not shown), for example, the usual internal combustion engine with variable fuel supply. A plurality of planet gears 8, for example three, are rotatably supported within the pump cavity 10 of the housing 7, and mesh with sun gear 9, integral with driven shaft 5.

The pump cavity 10 is so designed that each of the planet gears 8 is within an individual cylindrical portion or chamber 13 thereof, each such portion being concentric with its gear and connecting with the cylindrical chamber 12 housing sun gear 9 and concentric therewith. The cylindrical wall of chamber 12 has but a minimum clearance from the top of the teeth of sun gear 9 so as to form an effective hydraulic seal. For the greater portion 11' of their circumferential extent, and on the intake sides of the planet gears, the walls of chambers 13 are recessed to form a fluid passage around the tops of the planet gear teeth. The intake side of each planet gear has an individual series of fluid intake slots 11 on individual intake lines 21 in the pump housing 7. These slots are sealed from the pressure chamber of the pump 12 by the peripheral land 14 which extends a sufficient distance around the planet gear 8 so as to form continuously a hydraulic seal with one or more of the planet gear teeth.

Each interstice between the teeth of sun gear 9 is connected by a plurality of ports 19 to an individual tubular bore 15 parallel to the axis of rotation of the gear. Within each tubular bore 15 is a slide valve 18 having end portion or piston 16 thereof a snug fit to the bore 15, and its other portion, a plunger 17, a snug fit with tubular bore 20, connecting with tubular bore 15 and extending to and within the hydraulic motor mechanism. Piston 16 is of a larger diameter than plunger 17 so that any pressure within bore 15 and between the said piston and plunger exerts more force on the piston than upon the plunger. There is thus, whenever such pressure is present, always a resulting force tending to force the slide valve 18 to the right in the construction illustrated. The length of the slide valve 18 between piston 16 and plunger 17 is such that even when plunger 17 blocks the outlet bore 20, piston 16 does not interfere with ports 19, and when the valve 18 is in its extreme right position, at starting, plunger 17 likewise does not interfere with ports 19. Obviously such individual bores, 15 and 20, parallel to the axis of rotation of the pump and motor sun gears and connecting from pump to motor, may also be provided in the tooth portions of the gears, or may be there positioned alone, or spread along the length of the teeth, or may be in any desired combination of interstice and tooth position, just so long as appropriate valving is provided to prevent fluid from being sucked back from the bores 15 into the inletting interstices.

The automatic control valve is also housed within pump housing 7, and comprises a centrifugal flyweight 22, or a plurality thereof, which, by the action of gear 28 on the cylindrical rack 25, tends to actuate inlet valve piston 23 on rotation. Valve head 29 of piston 23 normally engages seat 30, thereby closing inlet passage or passages 21. Piston 23 is so constructed and mounted as to have its body engage housing 7 and rotate therewith while capable of lateral displacement therein. Valve head 29 tends to remain in such seated position by spring 32 tending to pull projection 31 mounted in piston 23 to the right. The other end 33 of piston 23 is supported by thrust bearing 34, which transmits its lateral motion to plate 35, rotatable with, but laterally displaceable on, driven shaft 5. Plate 35 imparts its lateral motion to the slide valves 18, to the piston ends 16 of which the plate is connected. The lower portion of the enclosing housing constitutes the sump 36, the suction tube 37 extending therefrom to the bearing supply groove 38, which in turn connects to the shaft inlet 27 and valve 29.

The hydraulic motor mechanism is supported within housing 1, at or near the driven shaft bearing 3. Sun pinion 39 is integral with the driven shaft 5 and meshes with idler gears 40 and 41 within the formed gear cavity 42, having at all points, but where ports are provided, a minimum clearance from the top of the gear teeth and forming hydraulic seals. The inlet ports 43 at the interstices of the teeth of gear 39 connect with the above mentioned tubular bores 20. I have shown the pump pinion 9 and the motor pinion 39 with the same number of gear teeth and with the teeth in alignment. While this results in the simplest design, the number of gear teeth need not be the same and the teeth need not be in alignment. Just so long as the bores 20 connect a pair of interstices and the succession of each pair relative to the particular pair is the same, it is not necessary that the members of the pair be in the same physical phase. Four channels 44, from the cavity 42, constitute selective exhaust ports and are positioned at the gear tooth intersection lines and are provided with individual control valves 45, 46, 47, and 48. The exhaust control valves are paired, so that the upper left 45 and the lower right 48 are opened together, while the upper right 46 and lower left 47 are closed, and vice versa. They are operatable by the manual lever 49, accessible outside casing 1 at some place convenient to the operator. Lever 49 is rigidly connected to shaft 50, carrying gears 51 and 52, which, through gears 53 and 54, respectively, operate cam shafts 55 and 56. Upper cam shaft 55 carries cams 57 and 58 so positioned thereon that their throw occurs 180° apart. Similarly lower cam shaft 56 carries cams 59 and 60 similarly arranged, cam 59 being paired, as stated, with cam 58, and 60 with 57. Lever 49 is so arranged that it may remain in only one of two positions and never any other position except under the operator's restraint on lever 49. Such arrangements are known and are not illustrated. Each one of such positions of lever 49 corresponds to a cam position in which one of the pairs of exhaust ports is open, while the other is closed. The exhaust valves open into, respectively, the upper and lower exhaust bores 24 and 26, from which the fluid spills into sump 36.

The casing 1 having been supplied with sufficient fluid, for example, oil, the lever 49 is positioned so that the automotive vehicle is in forward driving position. This position is ordinarily the one in which the driven shaft will rotate in the same direction as the driving shaft, so that there may be direct 1:1 drive for normal "high gear" operation. The prime mover is thereupon started and the driving shaft 4 permitted to idle at slow speed. Under these conditions flyweights 22 will not overcome bias spring 31 and the inlet valve 30 remains closed. Thus no fluid can flow and planet gears 8 idly roll over stationary sun gear 9. No power is thus transmitted and driven shaft 5 remains at rest.

To start the driven shaft 5, and thus the automotive vehicle, the driving torque of the prime mover is increased, for example, by supplying more fuel, i. e., "opening the throttle." As the drive shaft 4 speeds up, the flyweights 22 overcome the biasing spring 31, moving piston 23 to the left and opening valve 30. As the pump planets 8 are rotating, while the pump sun gear 9 is still stationary, pumping action takes place and fluid is sucked from sump 36 by suction tube 37 through 38 and 27 to valve seat 30 and thence to inlet bores 21, inlet ports 11, planet gears 8, and sun gear 9. As an oil filled interstice of a tooth of gear 8 mates with a tooth of gear 9, the fluid is forced through pump outlet bore 15 and a motor inlet bore 20 to the fluid motor. The sliding valve 18 within each bore 15 is positioned so that plunger 17 does not engage bore 20. In the motor the flow is restricted in that such bores 20 which empty into those portions of the motor gear cavity which are blocked off by the closed valves stop the flow as there is no outlet for it. Thus in the position of the valves shown in Figure 3, with valves 45 and 46 closed, hydraulic pressure is built up in the regions 63 and 64. It will be noted that such pressure on motor sun gear 39 is also transmitted to pump sun gear 9, both of which are on the driven shaft 5. If this pressure is not restrained by a load torque, the motor gears must turn as there is no pressure in the alternate ports and a turning moment is established which creates a torque. There is no pressure in the alternate ports as the valves 47 and 46 are fully open to the atmospheric pressure obtaining within casing 1. It will be noted that the direction of the turning moment is not dependent on the direction of rotation of the driving shaft. As long as there is fluid pressure in one or more tubular bores 20 connected to interstices in the motor that are blocked by the closed valves of the motor, the driven shaft 5 can be rotated in either direction at will. Such bores 20 as are not blocked by closed motor valves, are pumping fluid at negligible pressure so that a minimum of power is wasted. As the pump and motor devices are integral mechanically, and the tubular bores in the construction illustrated represent six separate and individual hydraulic systems, they act individually in succession as their associated interstices pass through the high pressure valve areas. With the overlapping multiple design as shown, there will thus be one or more tubular bores in action at any time.

If the torque created by the pressure overcomes the load torque on the driven shaft, the latter will rotate. In the valve setting of Figure 3 the direction will be clockwise, and obviously will be counter-clockwise if valves 46 and 47 are closed, and 45 and 48 opened. As the motor sun gear rotates the fluid passes out through the open valves, through the upper and lower exhaust bores and drops into the sump, from whence it is recirculated. It will be noted that, by the relative rotation of the pump and motor housing, there results the intermittent connection of a pressure volume in the pump to an exhaust port in the motor, which would have the effect, were the mechanism not in multiple, of producing an intermittent transmission of power. However, the action of the pump and motor pinions overlap so that at any point in rotation a closed pressure system is created by at least one of their combinations. As the fluid is incompressible, the total driving action is taken by such closed pressure combination, or combinations, and the transmission is continuous.

If the static, or rotating, load torque is greater than the driving torque multipled by the hydrostatic action conversion ratio as fixed by the ratio of the volumetric displacements, the driving shaft 4 will slow down. Flyweights 22 thus will not overcome spring action 32 to the same extent and piston 23 will move to the right to throttle the inlet fluid flowing to the pump until the pump displacement is only partly filled, changing the action from hydrostatic to "hydropulse" conversion which gives increased torque ratios. The throttling effect will increase until the torque created on the driven shaft by the pump reaction, and the motor action, overcomes the load torque, at which point the action becomes steady. If the driving torque is increased over the requirement, the system will tend to accelerate and the inlet valve 30 will open until full volumetric discharge of the pump is in action. At this point the hydrostatic torque conversion will again take place. As the speed increases the piston 23 moves further to the left, whereby plate 35 pushes slide valves 18 to the left and the throttling plungers thereof start to restrict the pump motor inlet passages 20. As the flow is restricted the pressure in the piston chamber increases, and a resistance to the further leftward movement of the plungers 17 is created by the differential pressure on the plungers 17 and pistons 16. Thus the centrifugal flyweight action is at first counterbalanced by spring 31 and thereafter by the spring and the fluid pressure. The magnitudes of these actions can be fixed by design to meet the torque and speed requirements of the given prime mover and the load. Thus a pressure differential between the pump and motor is created, and the power transmitted to driven shaft 5 is divided between them in accordance with the ratio of their displacements multiplied by the respective pressures on them. As these throttling plungers 17 close the said passages 20, the pressure in the motor rapidly becomes negligible and the torque load is assumed by the pump mechanism. When the plungers completely restrict the flow to the motor, and shafts 4 and 5 are rotationally interlocked, a direct or 1:1 transmission results.

In the foregoing description I have used the term "hydropulse," which requires defining. I employ such term to distinguish a form of mechanical-hydraulic action employed in my invention from the hydrostatic and hydrodynamic types of such action. The differences between such hydropulse action from each of the others, and the application thereof in principle to transmissions, are best explained with the aid of Figures 6 to 8 inclusive.

Figures 6A, 6B, 6C:
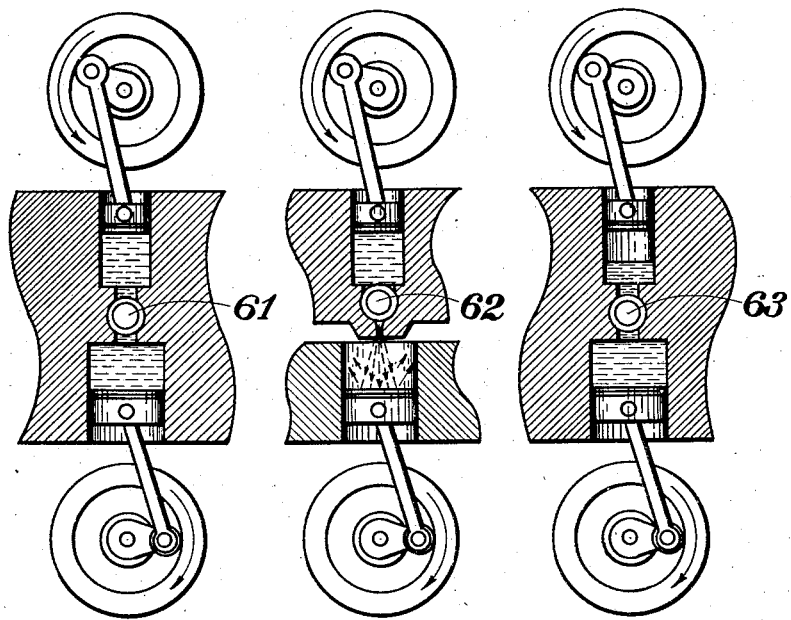

In Figure 6A there is shown a schematic view of hydrostatic mechanical-hydraulic action. Two rotatable shafts, each provided with a flywheel, have individual crank and piston mechanisms, with the two pistons working each in a separate cylinder in the same housing. Between the displacement areas of the cylinders is a connecting line controlled by a valve mechanism 61, indicated schematically and comprising inlet and outlet valves to each of the connecting cylinders operating in such manner that the upper driving cylinder receives a supply of incompressible fluid on its inlet stroke, passes such supply to the lower driven cylinder on its outlet stroke, and allows the lower driven cylinder to exhaust freely in the latter's outlet stroke. The hydraulic medium is indicated by the fluid designating cross-hatching in the schematic views. Thus valve mechanism 61 provides normal variable displacement pumping action in the driving cylinder and normal variable displacement motor action in the driven cylinder. In the schematic views of Figures 6A, 6B, 6C, I have shown the driving or pump cylinders, all of which are driven by a constant torque source of power, at the top, and the driven or motor cylinder at the bottom, in each instance. It is noted that the valve mechanism 61 may also be part of a multiple set of cylinder mechanisms in parallel with suitable phase displacement of their reciprocating and rotating parts to insure continuous positive coupling between the driving and driven shafts. The torque exerted on the lower, driven or motor, shaft will be in proportion to the ratio of the displacement of the upper, or pump, cylinder to that of the lower, or motor, cylinder. The speed of the motor shaft will be the reciprocal of such ratio. This is true as the fluid is incompressible and the displacements are completely filled and the leakage of the schematic mechanisms is negligible. The hydrostatic (Figure 6A) type of power transmission is particularly effective where non-slip conditions are required between the driving and the driven shafts. It is readily capable of handling large torques in small mechanisms, is quite efficient at low speeds, and particularly suited for a 1:1 ratio drive in a differential mechanism in which the fluid becomes essentially a static compression member. Its principal limitation is that it is fixed at a given ratio.

In Figure 6B hydrodynamic torque conversion is schematically shown. The upper cylinder, shaft, and crank mechanism is again the pumping mechanism and is essentially the same as the pumping mechanism of Figure 6A. The lower, or motor, mechanism is, however, different in that it is not necessary to restrain the motor piston in the same housing as the pump piston, although it may be. Valve mechanism 62 of Figure 6B permits drawing the fluid into the pump cylinder on the intake stroke and the ejection thereof through an accelerating nozzle to impinge on the motor piston. By said nozzle the hydraulic pressure energy created by the pump piston is converted into the kinetic energy of high speed streams of fluid directed against the face of the motor, or driven, lower piston. Obviously valve mechanism 62 must control the phasing of the ejected stream of fluid so as to shut off the stream on the return stroke of the pistons. With such hydrodynamic torque converters in multiple, full revolution torque action on the motor shaft will be maintained. I have shown this hydrodynamic principle by the schematic view of Figure 6B to keep its illustration as analogous to that of hydrostatic conversion as possible, rather than representing it by the more usual centrifugal pump actuating a hydraulic turbine or water wheel. It is to be noted that in the latter case the nozzle need not be present between the driving (pump) and driven (motor) blades of a rotary equipment as the form of the driving blade creates a fluid stream which causes a reaction force on that blade, or strikes the driven blade in the same manner as a stream from a nozzle. Hydrodynamic action is well suited to mechanisms in which the speed ratios and torque ratios are not great. Among its limitations are the relative low driven shaft torque obtainable in practice, and the relative high speed of the driven piston or vane necessary for efficiency. The latter must move with a speed of the order of magnitude of the nozzle stream because the peak efficiency of hydrodynamic mechanisms is obtained at conditions of low slip between the dynamic fluid stream and the mechanical element. Its main advantages are that by comparatively simple valve adjustments the speed and torque ratios may be varied, that latitude of design is allowed by the omission of a positive pressure housing structure between the driving and driven elements, and that extraordinary shock impulses cannot be transmitted through it.

In Figure 6C I illustrate what I designate the "hydro-pulse" mechanical-hydraulic torque conversion. The structure generally is the same as that of Figure 6A with only the basic difference that its valve mechanism 63 operates differently. Valve 63 is so arranged that it does not permit the upper pump, or driving, piston to draw through it sufficient fluid to completely fill the entire pump piston displacement on the inlet stroke. The pump piston displacement is permitted to fill only partially, and for the greater part of its stroke the pump piston is out of contact with the fluid. As to the driven, or motor, piston the action of valve 63 is the same as that of valve 61 of Figure 6A, that is, as pressure is created by the pumping mechanism, 63 valves the fluid into the motor or driven mechanism with the proper phasing to make the motor rotation continuous. Just as the pump mechanisms of Figures 6A and 6B, so also is that of Figure 6C operated by a constant torque source of power, smoothed by a flywheel, which the pump shaft torque will attempt to accelerate continuously. However, in Figure 6C on the pump piston's intake stroke it has soon drawn in its partial fluid charge and then, as the fluid is inexpandable and incompressible, the pump piston for the balance of its intake stroke will be opposed only by a negligible atmospheric pressure. On the return and discharge stroke, the pump piston for all of its travel while out of contact with the fluid, and assisted by atmospheric pressure, will continue to accelerate and store rotational energy in the pump shaft flywheel. When the pump piston, on the last part of its discharge stroke, engages the fluid the driving torque will attempt to maintain the same energy transfer conditions. If there is resisting pressure on the fluid sufficient to exceed the force of the driving torque, the driving mechanism will not only be held to constant speed but will be decelerated, the deceleration lasting during the active exhaust stroke. As soon as the exhaust stroke is over, the driving mechanism will again start to accelerate. Steady state conditions will result when the deceleration during the active portion of the cycle is equalized by the acceleration during the non-active portion. If the driving and the driven torque be considered constant, any ratio between them can be matched by proportioning the amount of inlet fluid through the pump mechanism. The hereinbefore hydropulse action is analogous to the action of a mechanical punch press in that energy, stored in a flywheel the greater portion of a cycle, is removed at extremely high forces during a small fraction of the cycle. Like the punch press, hydropulse action offers the advantage of exerting tremendous forces at slow over-all speeds by means of relatively low prime mover power. Its range may be varied through wide ratios by very simple valve operations. By further valve operations hydropulse action, as shown, can be changed over to hydrostatic action. Power efficiencies of hydropulse action are low compared to general power transmissions, but this is of little practical effect, for the exertion of large driven torques though necessary is the extraordinary condition and their application is generally of short duration. Hydropulse action has both positive and flexible control to meet such conditions.

In Figure 7 I disclose a schematic view of a power transmission combining hydrostatic and hydropulse action. Driving shaft 100, provided with flywheel 101, is integral with the central element 102 of a positive displacement pump of the eccentric cylinder and sliding vane type. Vane 103 is slidable radially in and out of element 102, a spring (not shown) constantly urging it outwardly into contact with cylinder wall 104 eccentric to shaft 100 and in housing 105 integral with driven shaft 106. Fluid inlet port 107 connects from the cylinder wall 104 to the exterior of housing 105, and with a symbolic inlet valve 118 in the external fluid line 117. Valve 118 may be manually actuated, but is preferably automatic and, combined in action with valve 108, controls the flow of fluid from pump to motor. Fluid outlet port 119 connects the interior of cylinder wall 104 to the symbolic outlet valve 108 within the housing 105. Valve 108 passes the fluid through bore 109 to the fluid motor inlet port 111. The fluid motor is built into the stationary housing 113, the cylindrical wall 114 being eccentric to the motor rotor element 110, which is integral with driven shaft 106. Motor vane 112 is similar in its construction and in its spring guided radial motion to pump vane 103. Motor inlet port 111 is, however, a part of the rotatable central motor element 110, and is so positioned, relative to vane 112, as to admit the fluid supply pressure at all times to the expanding volume in the motor. Motor outlet port 115 is connected by bore 116 in housing 113 to fluid supply line 117. Motor exhaust port 115 is on the decreasing side of the motor cylinder seal clearance, so that the fluid in that volume can have no gauge pressure. External fluid line 117 may be to a pump, or open to atmospheric pressure.

When driving shaft 100 is moved by a constant torque prime mover, not shown, pump vane 103 will rotate and in passing inlet port 107, positioned at a point of minimum clearance between the cylindrical surface 102 and the cylindrical surface 104, a region of expanding volume will be formed between such surfaces and the lagging side of the vane. If now valve 118 be open to connect port 107 to the fluid supply 117, this expanding volume will be filled by fluid under atmospheric induction (or with the aid of a pump not shown). In the meantime the volume on the leading side of vane 103 is decreasing and the fluid in said decreasing volume is forced out through exhaust pump port 119. If valve 108 is wide open, and thus passing fluid with negligible impedance to the flow, the pump vane will rotate as long as the torque of the prime mover can overcome the hydraulic pressure built up in the motor element. The passed fluid travels into the expanding motor volume, through motor inlet port 111 positioned as above stated, thus creating a torque between housing 113 and driven shaft 106. Theoretically, the torque produced in the motor is a function of the pressure transmitted from the pump element and is independent of the speed of the driven shaft.

The total torque on shaft 106 is the sum of that developed in the motor element and the reaction on the pump housing 105 produced by the pump element. When the pump is operating with restriction at valve 108 the fluid pressure in the pump and motor must be equal. In any case, the fluid volume passing through the pump and the motor is identical. Thus the ratio of the speed of the driven shaft 106 relative to the transmission housing 113 to the speed of the driving shaft 100 relative to the pump housing 105 is the ratio of the motor and pump effective displacements. Therefore the speed of the driving shaft 100 relative to the transmission housing 113 can be expressed as follows:

R. P. M. drive shaft = R. P. M. driven shaft × $\left(1 + \frac{\text{Motor displacement}}{\text{Pump displacement}}\right)$ Neglecting friction and leakage, the fluid and mechanical energy has no other means of dissipation than the driven shaft 106, so theoretically the power on the driving shaft 100 and the driven shaft 106 must be the same. Hence the torque on these shafts must be inversely proportional to their speeds of rotation. From this it is seen that a theoretically infinite torque multiplication can be effected by restricting the pump inlet flow at valve 118, to decrease the effective displacement of the pump, and thus increase the ratio of the motor displacement to the pump displacement. This is an illustration of the hydropulse torque conversion applied to a differential hydraulic mechanism.

Consideration of the speed equation will show that as long as it holds the two shafts cannot have equal speeds unless the motor displacement becomes infinitely smaller than the pump displacement. Practical considerations mitigate against decreasing this below the ratio of the maximum pump and motor displacements. As practical design dictates that the two displacements be in the same order of magnitude (but not necessarily equal), there will be an appreciable rotational slip between the driving and driven shafts as long as the equation holds.

In order to obtain a 1:1 transmission ratio with continuous variation down to the maximum practically obtainable in the above equation, a new element is introduced by the action of valve 108. This restricts the flow out of the pump and puts a pressure differential between the pump and motor. Thus the torque transmitted by the pump reaction is increased. Conversely that created by the motor is decreased by a like amount. Carried to the extreme, by closing valve 108 completely, the pump element will assume the entire torque and the drive will be 1:1 ratio. During the above changes the differential fluid energy transmitted to the motor can be transformed by it into torque, even with a non-expanding fluid. However, practical design of such mechanism is difficult and the differential energy in such case is a very small percentage of the total, so that actual designs will probably act as controlled slip mechanisms rather than true torque converters in this range. During these changes in torque and speed conditions, the driven shaft will accelerate, or the driving shaft decelerate, to come into synchronous speed with the other, the actual results depending upon the load and the prime mover torque conditions. To assure smooth action it is assumed that the mass of the load on the driven shaft is sufficient to act as a flywheel on such shaft, but if it is not, a flywheel is placed on said shaft 106.

While the displacement pump and motor of the sliding vane type above described are workable, their design possibilities are not as good as those offered by the gear type rotary displacement pump, such as I have shown in Figures 1 to 5, and hereinbefore described, and in my other specific construction shown in Figure 8 hereinafter described. The gear type rotary displacement pump is useful in hydraulic work over a wide range from vacuum to extreme high pressure systems. Consider two meshing gears with incompressible fluid filling the interstices between the gear teeth. Each gear, except where the teeth of one mesh with the other, is enclosed by a concentric cylindrical housing with fine clearance between it and the gear teeth tops, thus restraining the fluid radially as the gears rotate. The two housings, or, if a plurality of gears mesh, then the plurality of housings, end at their mutual points of intersection which is practically the point of intersection of the addendum circles of the meshing gears. As a tooth of one gear mates with the interstice of the meshing gear, it projects into the interstice reducing its effective volume. Thus the fluid must be forced out of the interstice, and fluid pressure will be created depending on the restrictions of the exhaust flow. As is known, ports may be bored in the housing either at the point of the intersection formed by the housing cylinders, or in the end housing faces. These ports are located so as to allow the fluid under pressure to be forced from the interstice. The fluid is prevented from flowing into the preceding interstice by the fine clearance formed at the point of contact of the mating tooth faces. The fluid space in a tooth interstice will thus decrease until the center of the tooth interstice has passed the center line of the gear centers. Then the mating tooth will recede and the volume will increase, and if accurately designed this action can be used to create a considerable vacuum. However, in most pumps this action is used to induce the fluid charge into the pump by atmospheric pressure, by providing ports on the inlet side of the pump positioned at the image positions of the outlet ports, and connecting fluid lines to them as in the self-priming pumps. After filling the tooth interstice, the fluid is carried around the gear tooth path until a mating tooth of a meshing gear again enters it.

In known gear pumps a common fault, limiting their usefulness and causing them to be subject to severe vibration under high speed and high pressure conditions, is "trapping." As the mating interstice approaches the center line of the gear centers, the leading contact is still formed and at the same time a second point of contact is being formed rapidly between the back face of the mating tooth and the back face of the interstice. Thus the fluid between these two contacts is trapped and must be forced through relatively small clearances. The hydraulic pressures created under such conditions frequently spring substantial pump shafts and damage bearings. The fluid speeds will "wire draw" the sides of the fine clearance much the same as they will in faulty high pressure valves. The action of the fluid being forced through the orifice will tend to break down the chemical structure of organic fluids, such as oils, causing them to be unsuited to the operation. So also the intense tooth pressure between the gears will cause "brinelling" of their surfaces ruining the tooth form. The fluid forced from the trapped area generally passes through the leading clearance as there is less resisting pressure in this direction, thus partially filling the expanding volume and reducing pump efficiency. To minimize trapping, most pumps are designed with wide clearances or with overlapping ports, considerably decreasing pump efficiency.

The gear pump structure is also used as a hydraulic motor. As it is self-valving and has a positive displacement action, it will be seen that if fluid pressure is admitted to the ports on one side, and the other side is vented freely to the atmosphere, or to reduced pressure, the gears will rotate unless restrained by a torque great enough to overcome the inlet-outlet pressure differential. The advantage of such a motor is that it can be designed to provide positive non-overrunning movement. Its disadvantage is that trapping occurs where the gears mesh unless inefficient clearances or ports are provided.

The ordinary gear pump structure consists of two gears meshing at one point. While such a gear pump can be designed into my variable speed transmissions, I prefer the use of structures having one central, or sun, gear mating with two, three, or more, other or planet gears. It will be noted that the hydraulic motor of Figure 1 comprises a sun gear with two planets, while the pump of Figure 1 comprises a sun gear with three planets. These multiple arrangements offer balanced conditions on the sun gear bearings and the possibility of minimizing resonant impulses between these and with other elements of the whole transmission system. It will be particularly noted that both the pump gears, 8 and 9, and the motor gears 39, 40, and 41, have overcome the trapping effect above discussed. As a tooth meshes with an oil filled interstice, the pressure built up is relieved and the fluid exhausted through the tubular bores in the driven shaft connecting with the radial bores in the interstices of the sun gears. Thus any fluid trapped at the top of a tooth and the bottom of an interstice is relieved without the above mentioned destructive pressure and velocity conditions by the appropriate radial bores in the respective sun gears.

In Figure 8, the driving shaft 230 and the driven shaft 231 are coupled by a triple planet pump mechanism of the type described in detail above, essentially comprising sun gear 232, pump planets 234, and planet housing 235 integral with the driven shaft, and having clearance on the inlet side of the pump planets. The flexible fluid supply line 236 connects to the sleeve type slide valve mechanism 237 and the latter in turn to supply bore 238 and the clearance inlet slots around the pump planets, as hereinbefore described in detail in connection with Figure 2. Individual bores 239 in the driving shaft are adapted to receive pumped fluid from an end of the individual sun gear tooth interstices. I can also employ sun gears with radial bores connecting to the interstices and the bores parallel to the shaft axis, as I have used in the transmission of Figure 1. Individual bores 239 terminate in a series of radial nozzles 240 adapted to direct their fluid streams against vanes 241 of hydraulic reaction turbine integral with driving shaft 230. Thrust bearing 248 compensates for the interstices' end pressure thrust between the driving and driven shafts. Control mechanism 249 is splined to the driving shaft so that it revolves with it but is free to move laterally along it. It comprises a sleeve 243 adapted to cover and uncover nozzles 239, and a gear 244 rigidly connected to a flyweight 242 pivoted to the sleeve. Gear 244 meshes with rack 250 cut into the driving shaft. Motion of the sleeve 243 caused by the flyweight and the rack and gear is opposed by biasing spring 245 which normally keeps sleeve 243 in the position where all nozzles 239 are uncovered. Sleeve 243 also carries a circular thrust face 254 on which rides the short end of lever 251. This lever 251 is pivoted around fixed pin 255 and is held in place against face 254 by spring 256 and link 257. The force on spring 256 is transmitted to arm 258 which is integral with supply sleeve 237. The supply sleeve 237 is pulled to the left by spring 259 which is weaker than the spring 256 so that it does not act until the latter is fully relieved. By this arrangement, when valve 243 has fully uncovered the nozzles, further movement thereof to the right moves inlet valve 237 to the left and restricts the flow of inlet fluid to the pump. Shaft 230 is stepped at 252 to permit the formation between it and sleeve 243 of an annular chamber 246, to which fluid is admitted from tubular bore 239 by the restricted passage 253. Fluid to the annular chamber may be obtained from any one of the tubular bores or from them all in parallel if the passages 253 are sufficiently restricted to prevent more than negligible fluid power passing between them.

As the driving shaft 230 is started, fluid inlet valve 237 is so positioned that fluid may flow freely under the action of the planet pump through uncovered nozzles 240. The streams from the nozzles impinge against the turbine vanes 241 where their reaction decelerates the velocity of the fluid and converts the energy into a rotational reaction torque in the direction of rotation of the mechanism, the spent fluid falling into the supply sump, not shown. This reaction torque effectively increases the driving shaft torque, and thus an increased torque is transmitted to the driven shaft. As the outlet nozzles are directed radially, they produce no useful force from the reaction of the fluid acceleration. As the centrifugal force increases, it moves flyweight 242 and gear 244 against the biasing spring 245 and the fluid pressure in the annular chamber 246, moving sleeve 243 over the nozzles, to the left in the figure. When the nozzles are blocked there is no fluid ejected, hence no slip, and the drive is direct, fluid being inducted into the pump mechanism to fill it completely. When the speed decreases, and the centrifugal force becomes less, or the torque transmitted becomes greater, fluid pressure in the annular control chamber 246 overcomes the centrifugal force and sleeve 243 slides to the right, uncovering the nozzles. This permits the discharge of fluid from the pump, allowing slip between the driving and driven shafts and creating additional torque on the driving shaft by means of hydrodynamic action. But as valve 243 moves to the right, the reversing linkage 251 moves the sleeve 237 to the left, restricting the fluid inlet flow to the pump, sleeve 237 registering only partially with fluid supply bore 238. Thus hydropulse action results, increasing the torque conversion and overcoming the overload causing the decreased shaft speed. As a result, sliding valve 243 will automatically adjust the rate of flow until it is balanced and a steady state of conversion has been reached. Biasing spring 245 is included in the mechanism as it uncovers the nozzles at low rotational speeds, thus relieving any hydraulic pressure and preventing the transmission of any torque so that the driving shaft may idle at low speeds.

The main advantage of the structure of Figure 8 over that of Figure 1 is that when the present structure is running normally with a straight 1:1 transmission, no idling parts of the hydraulic turbine (vanes 241) operate, resulting in a minimum power waste during normal running.

Although I have shown and described certain specific embodiments of my invention, I am fully aware that many modifications are possible. My invention, therefore, is not to be restricted except in so far as is necessitated by the prior art and by the spirit of the appended claims.

What I claim is:

1. In a hydraulic power transmission, a driving shaft, a driven shaft, intermeshed gearing coupling said shafts, a fluid confining housing enclosing said gearing, a passage for conducting fluid into said housing, a second fluid passage in and through said gearing through which fluid is propelled by said gearing to externally of said housing, a hydraulic motor external to said housing and adapted to be driven by the propelled fluid emitted from said second passage, and means within said second passage operatable by centrifugal force to restrict progressively the emitted fluid from a predetermined maximum down to zero as determined by the speed of the driving shaft and the load on the driven shaft.

2. In a power transmission, a driving shaft, a casing integral with said shaft and having a flywheel effect, a positive displacement hydraulic pump member on said driving shaft and within said casing, a passage for fluid from the exterior of said casing to the interior thereof, a driven shaft extending into said casing, a second pump member on said driven shaft and cooperating with said positive displacement hydraulic pump member, fluid motor means exterior to said casing, a second passage for fluid in and through said second pump member and to said fluid motor means, restricting means within said second passage for regulating the quantity and rate of fluid flow, and driving shaft speed control means for operating said restricting means.

3. A hydraulic differential torque converter comprising a driving shaft rotatable in a predetermined direction, an enclosing gear carrier rigid on such shaft and having appreciable mass, a plurality of planet gears rotatably supported in said gear carrier, a plurality of recesses in said gear carrier each concentric with an individual planet gear, a passage for fluid within said gear carrier having ports in each said recess, a valve in said passage centrifugally operatable by said gear carrier to regulate the amount of fluid introduced into the passage, a driven shaft centrally disposed in said gear carrier and extending therebeyond, a sun gear rigidly on said driven shaft on the portion thereof within the gear carrier and meshing with said planet gears, a recess in said gear carrier concentric with the sun gear and having minimum clearance therewith, the recesses for the planet gears having appreciable clearance from their respective gears for the greater portion including the fluid port region and minimum clearance shortly before and at the region of engagement of the teeth of their respective planet gears with those of the sun gear, a plurality of radial port groups spaced about said sun gear, an axial bore in said driven shaft for each of said radial port groups and connecting thereto, a valve in each said axial bore and centrifugally operatable by the rotation of said gear carrier to control the passage of fluid through said axial bores, a second sun gear on said driven shaft on the portion thereof extending externally of said gear carrier, a plurality of radial port groups spaced about said second sun gear and in phase corresponding to the port groups of the first sun gear, each said port group being connected to the axial bore of the corresponding group in the first sun gear, a plurality of gears engaging said second sun gear, a fixed enclosing housing about said second sun gear and its engaging gears, the interior of said housing having minimum clearance therefrom, fluid exhaust ports in said housing, and a plurality of valves in said fixed housing for blocking and unblocking selected exhaust ports to permit selective rotation of the driven shaft in the predetermined direction or in the direction opposite thereto.

4. A differential torque converter with hydraulic action, comprising a driving shaft, a casing integral with the driving shaft, a driven shaft, a first hydraulic pump element integral with the driving shaft, a second hydraulic pump element integral with the driven shaft and coacting with said first hydraulic pump element, both pump elements being enclosed in said casing, a hydraulic supply line to said pump elements, means in said hydraulic supply line for restricting the flow of fluid therein, a rotatable motor element integral with the driven shaft and positioned externally of said casing, a hydraulic output line from said pump elements to said rotatable motor element, and valve means in said hydraulic output line controlling the flow of fluid to said rotatable motor element.

5. A hydraulic differential torque converter comprising a driving shaft, a flywheel on said shaft, a positive displacement hydraulic member on said shaft, a casing enclosing said displacement member, a passage for fluid from the exterior of said casing to said displacement member, restricting means within said passage for regulating the fluid flow from zero to a maximum, a driven shaft extending into said casing, a pump member on said driven shaft and cooperating with said displacement member and within the casing, hydraulic motor means on the driven shaft exterior to said casing, a second passage for fluid in and through said pump member into said hydraulic motor means, a second restricting means within said second passage for regulating the fluid flow from a maximum to zero, a fluid exhaust from said motor means, and means for simultaneously operating both said restricting means so that the restricting means in the first passage opens the first passage while the second restricting means in the second passage closes the second passage.

6. A differential torque converter with hydraulic action comprising a driving shaft, an enlarged portion having a flywheel integral therewith, a first hydraulic pump element integral with said driving shaft, a driven shaft, a second hydraulic pump element integral with the driven shaft and coacting with said first hydraulic pump element, a hydraulic supply line to said pump elements, valve means for controlling the flow of fluid in said supply line, a hydraulic motor including a rotatable element integral with said driven shaft, a hydraulic output line from the second pump element to the rotatable motor element, a fluid exhaust from the motor, a second valve means in the output line interconnected with the valve means in the supply line, and means controlling both valve means so that on operation of the valve means in the supply line toward full opening of the supply line the second valve means is simultaneously operated toward closure of the output line.

7. A differential hydraulic torque converter comprising a first shaft, a casing integral with the first shaft and having a flywheel effect, a positive displacement hydraulic pump member on the first shaft within the casing, a second shaft extending into the casing, a second pump member on the second shaft coacting with the positive displacement pump member and also within the casing, a hydraulic motor including a rotatable element integral with the second shaft, a reservoir for fluid, a hydraulic line from the reservoir to the positive displacement member to and through the second pump member to and through the rotatable motor element through the motor and back to the reservoir, valving means in the hydraulic line, and means controlled by the speed of one of the shafts for actuating the valving means.

8. A differential torque converter with hydraulic action comprising a first shaft, a casing on the first shaft and having a flywheel effect, a first hydraulic pump member on the first shaft within the casing, a second shaft extending into the casing, a second hydraulic pump member on the second shaft within the casing and cooperating with the first pump member, a reservoir for fluid, an inlet for fluid from the reservoir into the casing to the first pump member, a valve in the inlet, a hydraulic motor including a rotatable motor element integral with the second shaft exterior to the casing, a hydraulic line from the second pump member through the rotatable motor element into the motor and thence to the reservoir, and means controlled by the speed of one of the shafts for actuating the valve from its position closing the inlet to the full open inlet position with increasing shaft speed.

9. A differential torque converted with hydraulic action comprising a first shaft, a casing on the first shaft and having a flywheel effect, a first hydraulic pump member on the first shaft within the casing, a second shaft extending into the casing, a second hydraulic pump member on the second shaft within the casing and cooperating with the first pump member, a reservoir for fluid, an inlet for fluid from the reservoir into the casing to the first pump member, a valve in the inlet, a hydraulic motor including a rotatable motor element integral with the second shaft exterior the casing, a hydraulic line from the second pump member through the rotatable motor element into the motor, a second valve in the hydraulic line, a hydraulic exhaust from the motor, and means controlled by the speed of one of the shafts for actuating both valves simultaneously with the inlet valve moving toward the full open inlet position and the second valve moving toward closure of the hydraulic line with increasing shaft speed.

10. A hydraulic differential torque converter comprising a driving shaft, a flywheel on the driving shaft, a positive displacement hydraulic pump member on the driving shaft, a fluid reservoir, a housing enclosing the displacement pump member, an intake for fluid from the reservoir into the housing and to the pump member, restricting means in the intake for regulating the fluid flow from zero to a maximum, a driven shaft extending into the housing, a second pump member on the driven shaft within the housing and cooperating with the positive displacement hydraulic pump member, fluid motor means exterior to the housing on the driven shaft, a fluid passage for conducting fluid from the second pump member to the hydraulic motor means, an exhaust for fluid from the motor means to the reservoir, and driving shaft speed control means for operating the restricting means towards maximum flow in the intake with increasing driving shaft speed.

11. A differential hydraulic torque converter comprising a driving shaft, a casing integral with the driving shaft and having a flywheel effect, a positive displacement hydraulic pump member on the driving shaft within the casing, a first passage for fluid from the exterior of the casing to the pump member, a valve within the fluid passage, a driven shaft extending into the casing, a second pump member on the driven shaft cooperating with the positive displacement hydraulic pump member, fluid motor means exterior to the casing on said driven shaft, a second fluid passage through the second pump member into the motor means, an exhaust passage for fluid from the motor means, and driving shaft speed control means for progressively operating the valve from closure to full opening of the first fluid passage with increasing speed of the driving shaft.

12. A differential hydraulic torque converter in accordance with claim 11, characterised by a second valve in the second fluid passage, valve opening means tending to retain the second valve in the position in which the second passage is full open, and means controlled by the speed of the driving shaft for progressively actuating the second valve toward the position in which it closes the second fluid passage with increasing driving shaft speed so that the second valve closes the second passage at a predetermined speed.

13. A hydraulic differential torque converter comprising a housing, a driving shaft, a flywheel on the driving shaft, a positive displacement hydraulic member on the driving shaft, a casing enclosing the positive displacement hydraulic member, a passage for fluid from the interior of the housing to the interior of the casing and the hydraulic member, restricting means within the passage for regulating the fluid flow from zero to a maximum, a driven shaft, a pump member on the driven shaft cooperating with the hydraulic member and within the casing, a motor member on the driven shaft exterior to the casing and within the housing, a second positive displacement hydraulic member on the housing cooperating with the motor member, a second fluid passage in and through the pump member, the driven shaft and the motor member to the second positive displacement hydraulic member, an exhaust passage for fluid from the region of cooperation of the motor member and the second positive displacement hydraulic member into the housing, a second restricting means within the second fluid passage, and driving shaft speed control means for operating the first restricting means from closure to full opening of the passage while operating the second restricting means from full opening to closure of the second passage with increasing speed of the driving shaft.

14. A differential torque converter comprising a driving shaft, a housing of appreciable mass on the driving shaft, a first recess in the housing, a first rotatable positive displacement hydraulic pump element supported within and substantially filling the first recess, a second recess in the housing connecting with the first recess, a driven shaft extending into the second recess, a second rotatable positive displacement hydraulic pump element on the driven shaft within and substantially filling the second recess and engaging with the first rotatable positive displacement hydraulic pump element, a fluid passage from without the housing into the first recess at a region remote from the engagement of the first and second rotatable positive displacement hydraulic pump elements, a valve in the fluid passage, valve closure means tending to retain the valve in its passage closing position, a plurality of fluid ports spaced around the second rotatable positive displacement hydraulic pump element extending therethrough into the driven shaft with each port independent of and hydraulically sealed from each other port, an axial bore in the driven shaft for each port and connecting with the particular port, a third rotatable positive displacement hydraulic element on the driven shaft exterior to the housing, a second plurality of fluid ports spaced around the third rotatable positive displacement hydraulic element extending therethrough into the driven shaft, the ports being independent of and hydraulically sealed from each other port in the third rotatable positive displacement hydraulic element with the individual ports connecting each with an individual axial bore, a fixed housing, a first recess in the fixed housing enclosing and substantially filled by the third rotatable positive displacement hydraulic element, a second recess in the fixed housing connecting with the first fixed housing recess, a fourth rotatable positive displacement hydraulic element in the second fixed housing recess engaging with the third rotatable positive displacement hydraulic element and substantially filling the second fixed housing recess, an exhaust port in the fixed housing to each side of the plane of the region of engagement of the third and fourth rotatable positive displacement hydraulic elements and extending into the second fixed housing recess in the region of its connection to the first fixed housing recess, means for blocking one exhaust port and unblocking the other exhaust port, and means controlled by the speed of the driving shaft progressively to actuate the valve against the valve closure means on increasing driving shaft speed to the fully open position of the passage at a predetermined driving shaft speed.

15. A differential hydraulic torque converter comprising a driving shaft, a housing of appreciable mass on the driving shaft, a first recess in the housing, a first rotatable hydraulic pump element supported within and substantially filling the first recess, a second recess in the housing connecting with the first recess, a driven shaft extending into the second recess, a second rotatable hydraulic pump element on the driven shaft within and substantially filling the second recess and engaging with the first rotatable hydraulic pump element, a fluid passage from without the housing into the first recess at a region remote from the engagement of the first and second rotatable hydraulic pump elements, a valve in the fluid passage, a plurality of fluid ports spaced around the second rotatable hydraulic pump element extending therethrough into the driven shaft with each port independent of and hydraulically sealed from each other port, an axial bore in the driven shaft for each port and connecting with the particular port, a valve positioned within each axial bore, valve closure means tending to retain the fluid passage valve in its passage closing position and tending to retain each axial bore valve in the bore full open position, a third rotatable hydraulic motor element on the driven shaft exterior to the housing, a second plurality of fluid ports spaced around the third rotatable hydraulic motor element extending therethrough into the driven shaft, the ports being independent of and hydraulically sealed from each other port in the third rotatable hydraulic motor element with the individual port connecting with an axial bore, a fixed housing, a first recess in the fixed housing enclosing and substantially filled by the third rotatable hydraulic motor element, a second recess in the fixed housing connecting with the first fixed housing recess, a fourth rotatable hydraulic motor element in the second fixed recess engaging with the third rotatable hydraulic motor element and substantially filling the second fixed housing recess, an exhaust port in the fixed housing to each side of the plane of the region of engagement of the third and fourth rotatable hydraulic motor elements and extending into the second fixed housing recess in the region of its connection to the first fixed housing recess, means for blocking one exhaust port and unblocking the other exhaust port, and means controlled by the speed of the driving shaft progressively to actuate the fluid passage valve with increasing driving shaft speed to the fully open position of the passage at a predetermined driving shaft speed and simultaneously actuating the axial bore valves so that at a second predetermined lower driving shaft speed the axial bores are each partially restricted and are wholly closed at the predetermined driving shaft speed.

16. A differential torque converter with hydraulic action comprising a housing, a driving shaft, a driven shaft, a first hydraulic pump element integral with the driving shaft, a second hydraulic pump element integral with the driven shaft coacting with the first pump element, a casing enclosing the pump elements, the pump elements each forming with the casing a plurality of positive hydraulic displacement units, a fluid supply passage to the first pump element, a first hydraulic motor element on the driven shaft exterior to the casing and enclosed by the housing, a second hydraulic motor element supported on and enclosed by the housing, the motor elements each forming with the housing a plurality of positive hydraulic displacement units, a branch fluid passage from each displacement unit of the second pump element to a different one of the displacement units of the first motor element, a fluid outlet passage on either side of the plane of engagement of the first and second motor elements and adjacent to such engagement region, and means in the outlet passages to block those displacement units of the motor elements connecting at the time with the one outlet passage and simultaneously to relieve those of the other displacement units of the motor elements connecting at the time with the other outlet passage.

17. A hydraulic torque converter comprising a driving shaft, a housing on the driving shaft, a first recess in the housing, a first rotatable hydraulic pump element supported within and substantially filling the first recess, a second recess in the housing connecting with the first recess, a driven shaft extending into the second recess, a second rotatable hydraulic pump element on the driven shaft within and substantially filling the second recess and engaging with the first rotatable hydraulic pump element, a fluid passage from without the housing into the first recess at a region remote from the engagement of the first and second rotatable hydraulic pump elements, a plurality of fluid ports spaced around the second rotatable hydraulic pump element extending therethrough into the driven shaft with each port independent of and hydraulically sealed from each other port, an axial bore in the driven shaft for each port and connecting to the particular port, a third rotatable hydraulic motor element on the driven shaft exterior to the housing, a second plurality of fluid ports spaced around the third rotatable hydraulic motor element extending therethrough into the driven shaft, the ports being independent of and hydraulically sealed from each other port in the third rotatable hydraulic motor element with the individual port connecting with an axial bore, a fixed housing, a first recess in the fixed housing enclosing and substantially filled by the third rotatable hydraulic motor element, a second recess in the fixed housing connecting with the first fixed housing recess, a fourth rotatable hydraulic motor element in the second fixed housing recess in engagement with the third rotatable hydraulic motor element and substantially filling the second fixed housing recess, an exhaust port in the fixed housing to each side of the plane of the region of engagement of the third and fourth rotatable hydraulic motor elements and extending into the second fixed housing recess in the region of its connection to the first fixed housing recess, and means for blocking one exhaust port and unblocking the other exhaust port.

18. A hydraulic torque converter according to claim 17 characterised by a valve positioned in each axial bore and means controlled by the speed of the driving shaft to actuate the valves to restrict the bores after a predetermined driving shaft speed is attained and to close the bores when a second predetermined higher driving shaft speed is attained.

19. A hydraulic torque converter comprising a driving shaft, a housing integral with the driving shaft, a first recess in the driving shaft housing, a fluid intake passage from without the housing into the recess, a first gear rotatably supported within the recess, the upper ends of the gear teeth forming hydraulic seals with the recess walls for a region extending over several gear teeth, a second recess in the driving shaft housing connecting with the first recess, a driven shaft, a second gear on the driven shaft within the second recess in engagement with the first gear, the upper ends of the second gear forming hydraulic seals with the walls of the second recess except for the region in which the two recesses interconnect and in which the first and second gears engage, a fluid port in the base of each tooth interstice of the second gear extending into the driven shaft, an axial bore in the driven shaft for each fluid port in the second gear and connecting with the individual port, a fixed housing, a first recess in the fixed housing, a second recess in the fixed housing connecting with the first fixed housing recess, a third gear on the driven shaft exterior the driving shaft housing with a sufficient number of teeth to provide a port in the tooth interstices of the third gear for each port in the second gear, the first fixed housing recess enclosing the third gear so that the upper ends of the teeth of the third gear form hydraulic seals with the walls of the first fixed housing recess except in the immediate region of interconnection of the first and second fixed housing recesses, a port positioned in the tooth interstices of the third gear for each axial bore, each port being individual to and connecting with one axial bore, a fourth gear rotatably supported on the fixed housing within the second fixed housing recess and engaging the third gear, the upper ends of the teeth of the fourth gear forming hydraulic seals with the walls of the second fixed housing recess except in the immediate region of the engagement of the third and fourth gears, a fluid exhaust passage to each side of the plane of engagement of the third and fourth gears and in the region of interconnection of the first and second fixed housing recesses to exterior the fixed housing, and means for blocking one exhaust port while relieving the other exhaust port whereby on rotation of the driving shaft and the flow of fluid through the intake passage into the first driving shaft housing recess into the tooth interstices of the first gear to and into the tooth interstices of the second gear into the fluid ports of the second gear through the axial bores to the interstices of the third gear and to the tooth interstices of the fourth gear, those of the fluid paths so determined for the period of the passage of their respective termination at the fourth gear into and through the relieved exhaust port are pressureless while simultaneously the other of the fluid paths so determined transmit hydraulic pressure to the fourth gear.

DICK PHELPS FULLERTON, Jr.